United States Patent
Simofi-Ilyes et al.

(10) Patent No.: US 7,105,969 B2
(45) Date of Patent: Sep. 12, 2006

(54) TWO SPEED ELECTRIC MOTOR WITH LINK WOUND DUAL-COMMUTATOR AND DUAL-ARMATURE WINDING

(75) Inventors: Attila Simofi-Ilyes, London (CA); Andrew Lakerdas, London (CA); Martin Volkening, London (CA); Stefan Smorowski, London (CA)

(73) Assignee: Siemens VDO Automotive, Inc., Chatham (CA)

( * ) Notice: Subject to any disclaimer, the term of this patent is extended or adjusted under 35 U.S.C. 154(b) by 0 days.

(21) Appl. No.: 10/976,615

(22) Filed: Oct. 29, 2004

(65) Prior Publication Data

US 2005/0225198 A1    Oct. 13, 2005

Related U.S. Application Data

(60) Provisional application No. 60/579,949, filed on Jun. 15, 2004, provisional application No. 60/560,457, filed on Apr. 8, 2004.

(51) Int. Cl.
*H02K 13/04* (2006.01)

(52) U.S. Cl. ..................... 310/136; 310/148

(58) Field of Classification Search .............. 310/127, 310/136, 137, 148, 149, DIG. 6, 233–237, 310/204

See application file for complete search history.

(56) References Cited

U.S. PATENT DOCUMENTS

| | | | |
|---|---|---|---|
| RE27,893 E | 1/1974 | Miller | |
| 4,910,790 A * | 3/1990 | Kershaw | 388/836 |
| 4,988,930 A | 1/1991 | Oberheide | 318/82 |
| 5,371,445 A | 12/1994 | Couetoux | 318/41 |
| 5,434,463 A * | 7/1995 | Horski | 310/248 |
| 5,485,049 A | 1/1996 | Shannon et al. | 310/248 |
| 5,614,775 A | 3/1997 | Horski et al. | 310/68 R |
| 5,689,148 A * | 11/1997 | Rubinchik | 310/239 |
| 5,925,999 A | 7/1999 | Lakerdas et al. | 318/496 |
| 5,949,174 A | 9/1999 | Moss et al. | 310/233 |
| 6,043,581 A | 3/2000 | Tanaka et al. | 310/197 |
| 6,075,300 A * | 6/2000 | Moss et al. | 310/136 |
| 6,075,305 A | 6/2000 | Daikoku et al. | 310/233 |
| 6,127,759 A | 10/2000 | Tanaka et al. | 310/233 |
| 6,218,755 B1 * | 4/2001 | Tanaka et al. | 310/204 |
| 6,320,293 B1 | 11/2001 | Yamada et al. | 310/233 |
| 6,694,599 B1 | 2/2004 | Kershaw et al. | 29/597 |
| 6,703,751 B1 | 3/2004 | Tanaka et al. | 310/198 |

FOREIGN PATENT DOCUMENTS

| | | |
|---|---|---|
| DE | 43 24 256 A1 * | 1/1995 |
| EP | 0277431 B1 | 9/1993 |

* cited by examiner

*Primary Examiner*—Dang Le

(57) ABSTRACT

A permanent magnet D.C. electric motor includes a stator housing, permanent magnet structure, and an armature assembly. The armature assembly includes a shaft rotatably mounted in the stator housing, lamination structure, first and second coil windings associated with the lamination structure, a first commutator electrically connected with the first coil windings, and second commutator electrically connected with the second coil windings, each of the first and second commutators being generally cylindrical and having a plurality of commutator segments. Certain segments of the first commutator and certain segments of the second commutator are electrically connected. The motor also includes a brush card assembly including a high speed side having first brush structure associated with the first commutator, and a low speed side having a second brush structure associated with the second commutator, and switches for selectively connecting a D.C. voltage in such a way as to cause the armature assembly to rotate at a first speed and a second speed.

24 Claims, 7 Drawing Sheets

TWO SPEED ELECTRIC MOTOR WITH LINK WOUND DUAL-COMMUTATOR AND DUAL-ARMATURE WINDING

This application is based on U.S. Provisional No. 60/560,457 filed on Apr. 8, 2004 and No. 60/579,949, filed on Jun. 15, 2004 and claims the benefit thereof for priority purposes.

FIELD OF THE INVENTION

This invention relates to automotive applications such as engine cooling, HVAC (Heating, Ventilation and Air Conditioning), or ABS (Anti-lock Braking System) and, more particularly, to an electric motor with link wound dual commutator and dual armature winding.

BACKGROUND OF THE INVENTION

Often permanent magnet motors used in automotive application require the use of more than one speed, usually a lower speed for general purpose operation and a maximum speed for worst-case operation. Multiple speed operation of a cooling system module of a vehicle provides a more optimized engine temperature and operation, which consequently contributes to improved fuel economy.

For permanent magnet direct current brush motors (PMDCBM), historically lower speeds (multiple speed operation) have been achieved by the following methods: Adding a resistor in series with the motor; Switching out brushes; Dual-armature winding with dual-commutator; Adding an additional third brush (short out coils); External or internal electronic control comprised of but not limited to SSR, (Solid State Relays); Linear control; and PWM, (Pulse Width Modulation).

With reference to FIG. 1, a conventional electric motor, generally indicated at 10, is shown having a dual-armature winding and dual-commutator configuration. Thus a first winding 12 is associated with a first commutator 14, and a second winding 16 is associated with a second commutator 18. The configuration of DC motors having dual-armature winding and dual-commutator are well known in the art. The following US. Patents describe the art of dual-armature winding and dual-commutator: U.S. Pat. Nos. 5,925,999 and 4,910,790, the content of each patent is hereby incorporated into the present specification by reference.

An electric motor with dual-armature winding and dual-commutator configuration provides an integrated solution for two speed application. Since there are no external components required for a second speed of operation, these types of motors are very commonly used in automotive applications. Furthermore, the motor efficiency is significantly better during the low speed operation with this solution than adding a series resistor. Compared to series resistor solution/method for low speed, beside the conventional motor losses, there is an additional loss of energy. This additional energy loss is dependent of the resistance of the resistor in series with the motor and the operating current (this energy loss is equivalent to $I^2 \ast R$).

The conventional motor shown in FIG. 1 was a high selling product in engine cooling for automotive applications, but with the development of more cost effective and reliable resistors, this product lost market share.

Thus, there is a need to improve the configuration of a dual-armature winding and dual-commutator motor by reducing the material and component usage and the overall system cost so this type of motor will again become an attractive and competitive product for engine cooling applications.

SUMMARY OF THE INVENTION

An object of the invention is to fulfill the need referred to above. In accordance with the principles of the present invention, this objective is achieved by providing a permanent magnet D.C. electric motor including a stator housing; permanent magnet structure carried by the stator housing for creating a fixed magnetic flux field therein; an armature assembly installed in the stator housing, the armature assembly including a shaft rotatably mounted in the stator housing, lamination structure, first and second coil windings associated with the lamination structure, a first commutator electrically connected with the first coil winding, and a second commutator electrically connected with the second coil winding, each of the first and second commutators being generally cylindrical and having a plurality of commutator segments, commutator segments of the first commutator that are disposed 720/N degrees apart being electrically connected and commutator segments of the second commutator that are disposed 720/N degrees apart being electrically connected, wherein N is the number of magnetic poles of the motor and is an integer greater than 2. The motor includes a brush card assembly with a high speed side having first brush structure operatively associated with the first commutator, and a low speed side opposite the high speed side. The low speed side has a second brush structure operatively associated with the second commutator. Due to electrically connecting commutator segments, fewer brushes are required to operate the motor at at least two different speeds.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which:

FIG. 3b is a sectional view of FIG. 3a.

DETAILED DESCRIPTION OF THE EXEMPLARY EMBODIMENT

Figure 1:
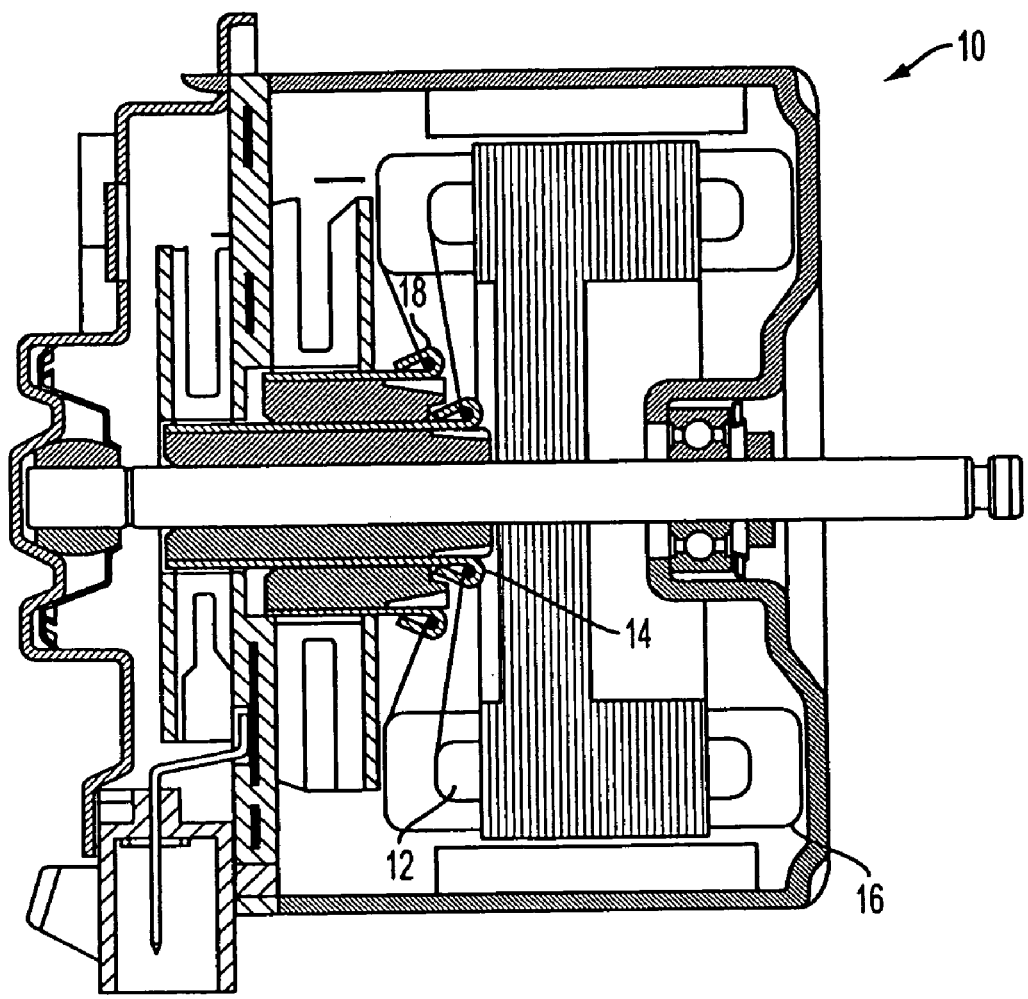
FIG. 1 is a sectional view of a conventional two-speed electric motor with dual commutator and dual armature winding configuration.
Figure 2:
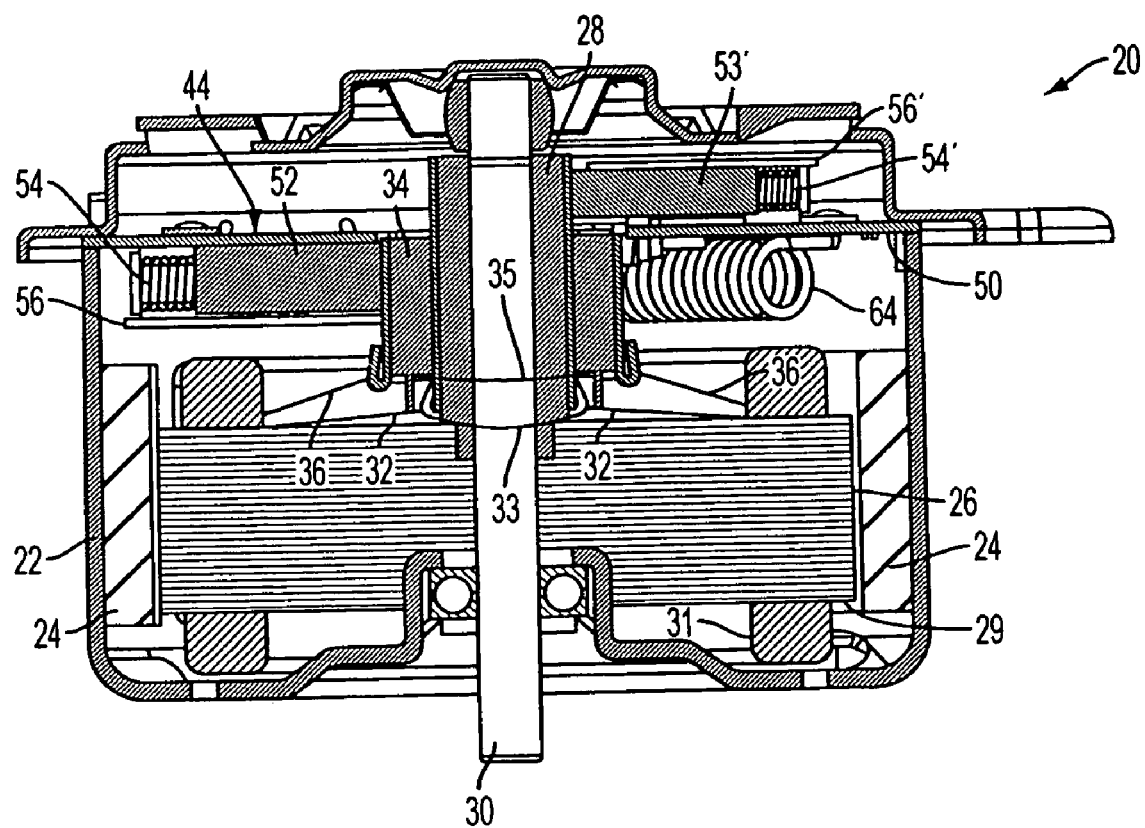
FIG. 2 is a sectional view of an electric motor with link wound, dual commutator and dual armature winding configuration in accordance with the invention.

With reference to FIG. 2, a permanent magnet DC brush motor of link wound, dual commutator and dual winding configuration is shown, generally indicated at 20, in accordance with the principles of the present invention. The motor 20 includes a stator housing 22 carrying permanent magnets 24 for creating a fixed magnetic flux field therein. An armature assembly is installed in the stator housing 22. The armature assembly includes a shaft 30 rotatably mounted in the stator housing, lamination structure or stack 26 having a plurality of radially extending arms 27 defining a plurality of coil receiving peripheral slots 29 there-between (FIG. 3a), first and second coil windings in the slots (winding mass is shown in FIG. 1 at 31), a link wound, low speed (LS) commutator electrically connected with a LS winding 32 and coupled with the shaft 30, and a link wound high speed HS commutator 34 electrically connected with an HS coil winding 36 mounted over the LS commutator 28. A link winding of the LS commutator 28 is indicated at 33 and a link winding of the HS commutator 34 is indicated at 35.

Figure 4:
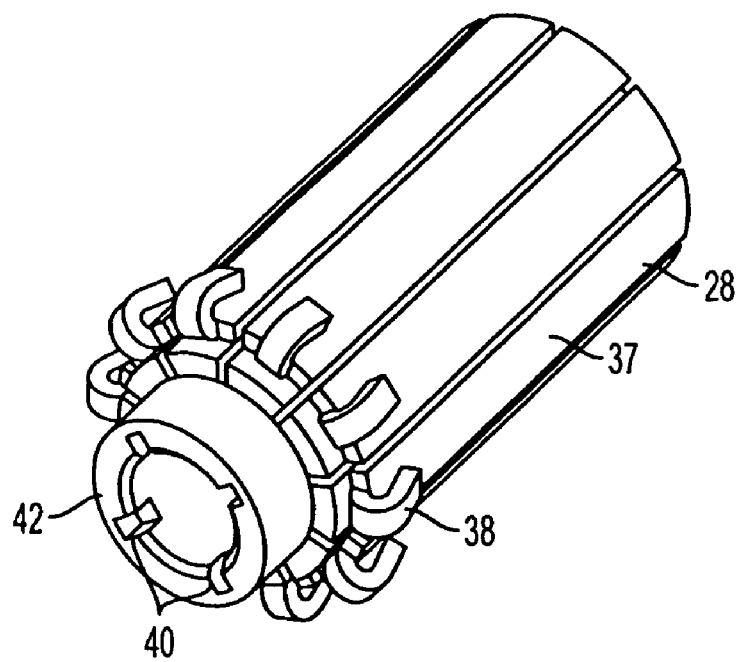
FIG. 4 is a perspective view of the commutator of the motor FIG. 2 for a low speed winding.
Figure 5:
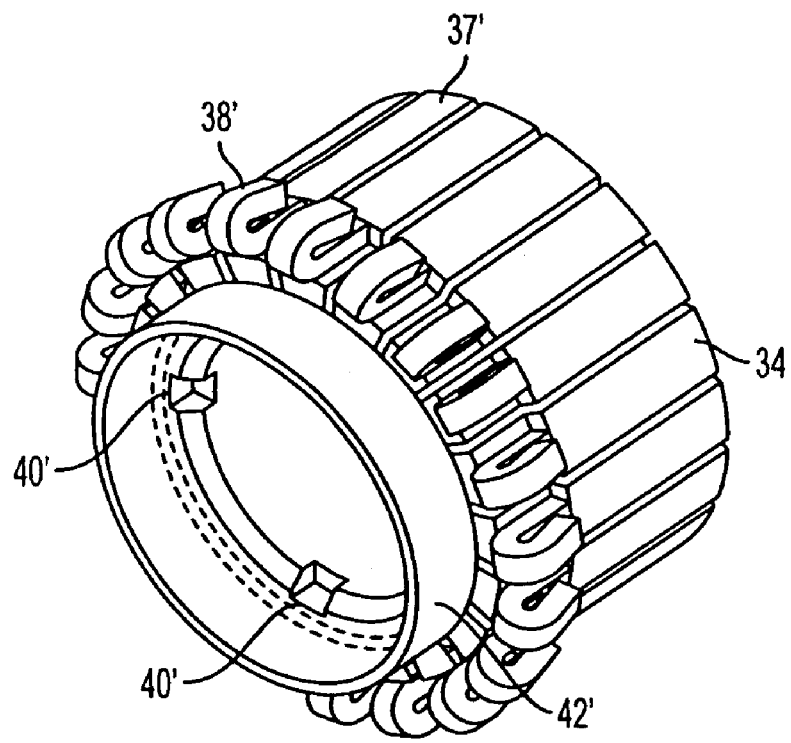
FIG. 5 is a perspective view of the commutator of the motor FIG. 2 for a high-speed winding.
Figure 8:
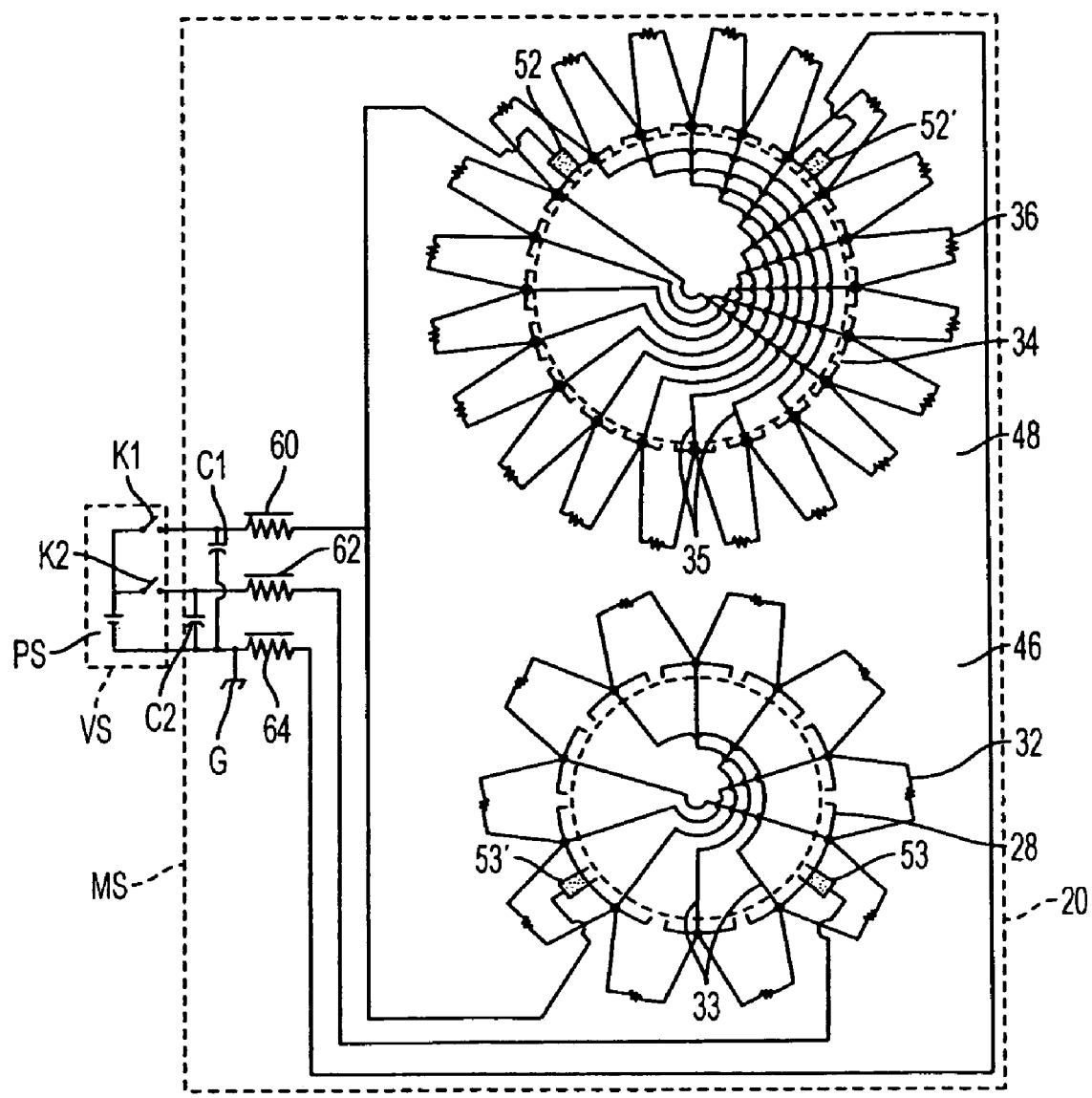
FIG. 8 is circuit diagram of the motor of FIG. 2 and the vehicle side electrical connections and switches.

The LS commutator 28, shown in FIG. 4, and the HS commutator 34, shown in FIG. 5, are configured to allow space for the associated link winding 33, and 35 respectively. Each link winding 33 and 35 is shown in FIG. 8 (but not limited to this method). The linking of commutator 28 is done preferably with a wire by electrically interconnecting each commutator bar 37, via respective hooks 38 (FIG. 4), with another commutator bar at 180° apart. Similarly, the linking of commutator 34 is done preferably with a wire by electrically interconnecting each commutator bar 37', via respective hooks 38' (FIG. 5), with another commutator bar at 180° apart. This link winding technology is disclosed, for example in U.S. Pat. No. 6,694,599, the contents of which is hereby incorporated into the present specification by reference.

There are features, such as recesses 40, 40', molded into the base of each respective commutator 28, 34 to position/locate the commutator during the link winding process. Also, each commutator 28, 34, includes a respective shoulder 42, 42' to support the link winding 33 and 35.

Figure 3A:
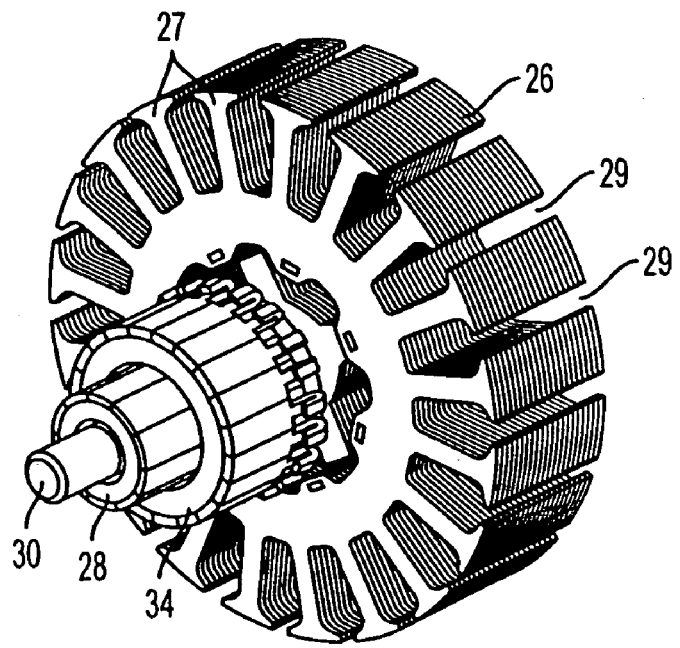
FIG. 3a is a perspective view of the armature assembly of the motor of FIG. 2, shown without the windings attached for clarity of illustration.
Figure 3B:
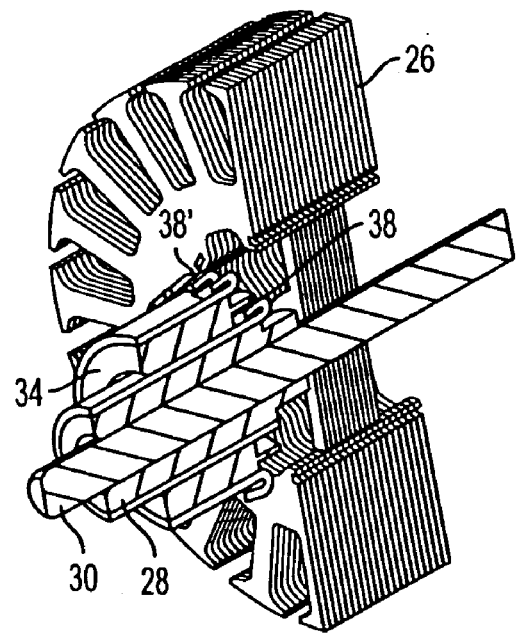

With reference to FIGS. 3a and 3b, after both commutators 28 and 34 are link wound, the LS commutator 28 is pressed onto the shaft 30 with the armature/lamination stack 26 and the LS winding 32 (not shown in FIGS. 3a, 3b) is added to the armature/lamination stack 26. Then, the LS commutator hooks 38 are welded and the commutator bars and machining is performed. The LS commutator 28 is longer and the diameter is smaller than the HS commutator 34. Therefore, the HS commutator 34 fits over the LS commutator 28 and only covers approximately half of the commutator bars of the LS commutator 28. Thus, the HS commutator 34 is mounted on top of the LS commutator 28 and the same process as described above with reference to the LS commutator 28 is repeated for the HS commutator 34. Finally, both commutators 28, 34 are machined after being pushed to a final position on shaft 30.

Figure 6:
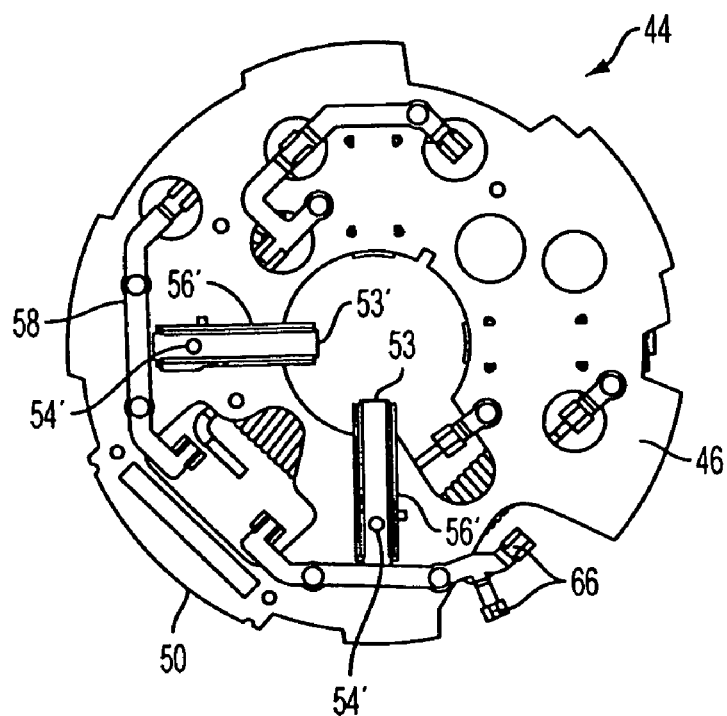
FIG. 6 shows a low speed side of a brush card assembly of the motor of FIG. 2.
Figure 7:
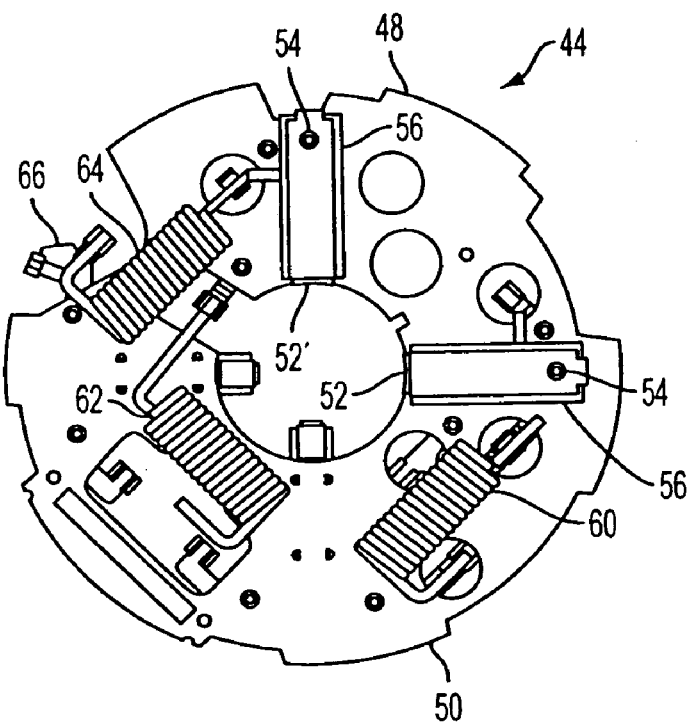
FIG. 7 shows a high-speed side of a brush card assembly of the motor of FIG. 2.

Since each commutator 28 and 34 is link-wound, in a four pole motor, advantageously, only two brushes are required on each side of the brush card assembly 44, one at the positive potential and one at the negative potential. By cross-linking sets of commutator bars, the second two positive and negative brushes of the conventional four pole motor are not required since the electrical paths are created by the link winding. Thus, the brush card assembly, generally indicated at 44 in FIG. 2, can be simplified, with the motor still operating properly with less brushes compared to prior art motor shown in FIG. 1. FIG. 6 shows the LS side 46 and FIG. 7 shows the HS side 48 of the same brush card 50 of the brush card assembly 44. As shown in FIG. 7, there is a pair of brushes (positive brush 52 and negative brush 52'), brush springs 54, and brush tubes 56 at the HS side 48 of the brush card 50. Also, as shown FIG. 6, there is a pair of brushes (positive brush 53 and negative brush 53'), brush springs 54', and brush tubes 56' at the LS side 46 of the brush card 50. Thus, the brush card assembly 44 and terminal bus bar 58 system is a much simpler configuration than the conventional assembly of FIG. 1.

As shown in FIG. 7, chokes, for Radio Frequency Interference (RFI) suppression, are provided on the HS side 48 of the assembly 44. Choke 60 is provided for both the positive brush 52 for HS and the negative brush 53'. Choke 62 is provided for the positive brush 53 for LS and choke 64 is provided for the negative brush 52' for both LS and HS. The brushes and tubes extend radially with respect to the generally circular brush card 50. A busbar contact 66 to the motor case or ground G is shown in FIGS. 6 and 7.

FIG. 8 illustrates the interconnections for both LS and HS circuits and the overall system layout. Thus, FIG. 8 illustrates how the brush card assembly conveys power for both speeds (LS and HS) operation and also illustrates the total electrical circuit layout including the vehicle side (VS) and motor side (MS) connections.

The Power Source (PS) or battery provides power to the system and, depending on what operation is required (LS or HS), switch K1 or K2 is turned ON. Switch K1 is turned ON and switch K2 is OFF when high-speed operation is required. Then power is conveyed only to brush 52 and the HS side armature winding 36 is energized through the linked wound, HS side commutator 34. The link wound interconnections (two identified at 35) are the same as, or similar to, those shown in U.S. Pat. No. 6,694,599. The motor 20 of the embodiment, being a four pole motor, operates with two brushes because the commutator 34 is linked wound and the four current paths are properly maintained; furthermore the brushes are properly positioned referenced to the magnet centerline and are positioned approximately 90 degrees apart from each other.

When low speed is required, the switch K2 is turned ON and the switch K1 is OFF. Then the power is conveyed first to the brush 53 and the current flows through the LS side armature winding 32, (the four current paths are maintained through the link wound, LS side commutator 28). The link wound interconnections (two identified at 33) are the same as, or similar to, those shown in U.S. Pat. No. 6,694,599. Furthermore, through the brush 53', the power is conveyed to the brush 52 and the armature winding 36 at HS side 48 is also energized. Therefore, at LS operation, the two armature windings 36 and 32 are connected in series. The brushes 53, 53' at the LS side 46 are positioned at approximately 180 deg. from the HS side brushes 52, 52'. Furthermore, the LS side brushes 53, 53' are also approximately 90 deg. apart from each other.

As noted above, chokes 60, 62 and 64 are provided on the brush card assembly 44 between each brush and PS for RFI (Radio Frequency Interference) suppression. Also capacitors C1 and C2 are provided for the same reason; one typical arrangements and placement of RFI components is shown in FIG. 8. However, the actual capacitor value and placement configuration has to be determined based on the suppression level required by the specific application.

Although FIG. 8 illustrates a circuit connection for two-speed motor operation, it is possible to accomplish an additional (third) speed operation by adding two additional switches, (K3 and K4 are not shown). The K3 switch is placed in the circuit to provide electrical connection to brush 53' for second speed (LS) operation. Also, the K3 function is to break the electrical connection between brush 53' and brush 52 during the third speed operation. The K4 is placed in the electrical circuit to connect the brush 53' to brush 52' for third speed operation, (brush 52' has the same potential as the negative side of PS or battery minus). Also the K4 switch function is to break the electrical connection between brushes 53' and 52' when the third speed is not required. The switches K1, K2, K3 and K4 can be, for example, electromagnetic relays or MOSFETs.

As shown in the embodiment of FIG. 8, the LS side commutator 28 is smaller than the HS side commutator 34 and has fewer commutator bars than commutator 34. Hence, the LS side brushes 53, 53' are smaller and closer to the center of the brush card 50 (see FIGS. 6 and 7). However, there is no significant change in the configuration of the brush card assembly 44 for a dual commutator configuration with same diametric dimensions for both commutators (FIG. 6). Thus, another embodiment could provide the link wound commutators 28 and 34 of the same size and having the same number of commutator bars. The electrical connection and components layout of this embodiment is essentially the same as shown in FIGS. 6 and 7 except all four brushes and brush tubes can be the same or similar size and can be placed at the same radial distance from the center of the generally circular brush card assembly 44.

Although only a four-pole motor has been described, the same concept can be applied also with 6, 8 . . . pole motor design. Thus, when N is the number of magnetic pole of the motor, and N is an even integer greater than 2, commutator segments disposed at angles of 720/N degrees are electrically connected or linked.

Figure 9:
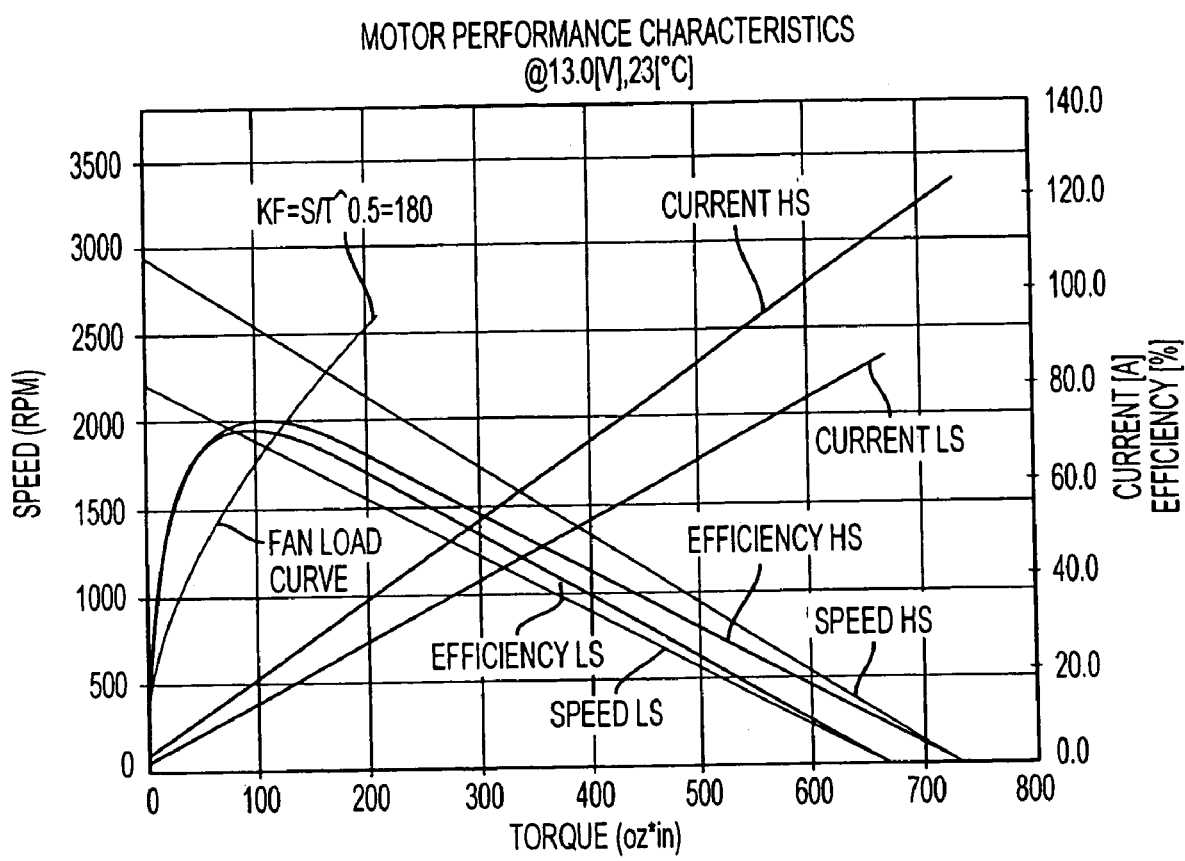
FIG. 9 is a graph of the typical performance characteristic of the motor of the invention for a 300-Watt application.

FIG. 9 illustrates typical performance characteristics of motor of the embodiment. On this chart is shown the motor speed, current and efficiency in function of torque for both HS and LS motor operations. The chart clearly shows that the motor operates approximately at the same efficiency at both LS and HS. (Although the operating power at LS is approximately half of the operating power of HS). The LS speed requirement is typically 20% of HS requirement and any other combinations can be achieved by changing the number of turns or wire size in the LS winding. Adding more turns of the same wire size would further decrease the speed at LS or removing turns the motor would speed up.

It can be appreciated that the motor 20 of the embodiment is more cost effective (due to less components) and is of simpler configuration than the conventional motor (FIG. 1), without compromising the functionality and integrity of the motor.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A permanent magnet D.C. electric motor comprising:
   a stator housing,
   permanent magnet structure carried by the stator housing for creating a fixed magnetic flux field therein,
   an armature assembly installed in the stator housing, the armature assembly comprising a shaft rotatably mounted in the stator housing, lamination structure, first and second coil windings associated with the lamination structure, a first commutator electrically connected with the first coil winding, and a second commutator electrically connected with the second coil winding, each of the first and second commutators being generally cylindrical and having a plurality of commutator segments, commutator segments of the first commutator that are disposed 720/N degrees apart being electrically interconnected and commutator segments of the second commutator that are disposed 720/N degrees apart being electrically interconnected, wherein N is the number of magnetic poles of the motor and is an even integer greater than 2, and
   a brush card assembly including a single brush card including a high speed side having first brush structure including first brushes operatively associated with the first commutator, and a low speed side opposite the high speed side, the low speed side having a second brush structure including second brushes operatively associated with the second commutator,
   wherein the number of first brushes is two and the number of second brushes is two, regardless of the valve of N.

2. The motor of claim 1, wherein the motor is a four-pole motor and the first brushes include a positive brush and a negative brush and the second brushes include positive brush and a negative brush.

3. The motor of claim 2, wherein each of the brushes on the low speed side is of a size smaller than each of the brushes on the high-speed side.

4. The motor of claim 3, wherein each brush on the low speed side is disposed radially closer to a center of the brush card than each brush on the high-speed side.

5. The motor of claim 1, in combination with means for connecting a D.C. voltage alternatively (1) to only one of said first and second brush structures so as to enable an associated commutator to transmit the D.C. voltage through associated coil windings in such a way as to cause the armature assembly to rotate at a first speed or (2) to both the first and second brush structures so as to enable the first and second commutators to transmit the D.C. voltage through the first and second coil windings in such a way as to cause the armature assembly to rotate at a second speed.

6. The motor of claim 5, wherein the means for connecting is a plurality of switches.

7. The motor of claim 6, wherein the switches are MOSFETs.

8. The motor of claim 1, wherein the brush card assembly is generally of circular configuration, with each brush being linear and extending radially.

9. The motor of claim 8, wherein the brushes on the low speed side are disposed generally 90 degrees apart from each other, and the brushes on the high speed side are disposed generally 90 degrees apart from each other.

10. The motor of claim 9, wherein the brushes on the low speed side are disposed generally 180 degrees from the brushes on the high-speed side.

11. The motor of claim 1, wherein the electrically interconnected segments are connected by a link winding in the form of a conductive wire, and wherein each commutator has a shoulder constructed and arranged to support associated link windings.

12. The motor of claim 11, wherein each commutator has structure constructed and arranged to locate the commutator during a process of connecting the link windings.

13. A permanent magnet D.C. electric motor comprising:
   a stator housing, permanent magnet structure carried by the stator housing for creating a fixed magnetic flux field therein, an armature assembly installed in the stator housing, the armature assembly comprising a shaft rotatably mounted in the stator housing, lamination structure, first and second coil windings associated with the lamination structure, a first commutator electrically connected with the first coil winding, and a second commutator electrically connected with the second coil winding, each of the first and second commutators being generally cylindrical and having a plurality of commutator segments, means for electrically interconnecting commutator segments of the first commutator that are disposed 720/N degrees apart, means for electrically interconnecting commutator segments of the second commutator that are disposed 720/N degrees apart, wherein N is the number of magnetic poles of the motor and is an even integer greater than 2, and a brush card assembly including a single brush card including a high speed side having first brush structure including first brushes operatively associated with the first commutator for operating the motor at a first speed, and a low speed side opposite the high speed side, the low speed side having a second brush structure including second brushes operatively associated with the second commutator for operating the motor at a speed less than the first speed, wherein the number of first brushes is two and the number of second brushes is two, regardless of the valve of N.

14. The motor of claim 13, wherein the means for electrically interconnecting segments is a conductive wire.

15. The motor of claim 13, wherein the motor is a four-pole motor and the first brushes include a positive brush and a negative brush and the second brushes include a positive brush and a negative brush.

16. The motor of claim 15, wherein each of the brushes on the low speed side is of a size smaller than each of the brushes on the high-speed side.

17. The motor of claim 13, in combination with means for controlling a D.C. voltage alternatively (1) to only one of said first and second brush structures so as to enable an associated commutator to transmit the D.C. voltage through associated coil windings in such a way as to cause the armature assembly to rotate at the first speed or (2) to both the first and second brush structures so as to enable the first and second commutators to transmit the D.C. voltage through the first and second coil windings in such a way as to cause the armature assembly to rotate at the second speed.

18. The motor of claim 17, wherein the means for controlling is a plurality of switches.

19. The motor of claim 18, wherein the switches are MOSFETs.

20. The motor of claim 13, wherein the brush card assembly is generally of circular configuration, with each brush being linear and extending radially.

21. The motor of claim 20, wherein the brushes on the low speed side are disposed generally 90 degrees apart from each other, and the brushes on the high speed side are disposed generally 90 degrees apart from each other.

22. The motor of claim 21, wherein the brushes on the low speed side are disposed generally 180 degrees from the brushes on the high-speed side.

23. The motor of claim 20, wherein each brush on the low speed side is disposed radially closer to a center of the brush card than each brush on the high-speed side.

24. The motor of claim 13, wherein each commutator has a shoulder constructed and arranged to support the means for electrically interconnecting segments.

\* \* \* \* \*